United States Patent Office 3,783,133
Patented Jan. 1, 1974

3,783,133
RIGID FIRE RETARDANT POLYURETHANE
FOAM
George Phillip Speranza, Austin, Tex., assignor to
Jefferson Chemical Company, Inc., Houston, Tex.
No Drawing. Continuation-in-part of abandoned application Ser. No. 843,743, July 22, 1969. This application Oct. 15, 1971, Ser. No. 189,724
Int. Cl. C08g 22/48
U.S. Cl. 260—2.5 AR    18 Claims

ABSTRACT OF THE DISCLOSURE

A rigid fire retardant polyurethane foam having good dimensional stability, more than 90% closed cells and a $k$ factor less than 0.13 is produced by reacting with a polyol blend containing a sucrose polyol which is the reaction product of 8 to 12 mols of propylene oxide per mol of sucrose or a sucrose polyol which is the reaction product of 9 to 12 mols of propylene oxide per mol of sucrose an isocyanato terminated prepolymer formed by reacting an excess of a polymethylene polyphenyl isocyanate with a phosphorus-containing polyol in the presence of a blowing agent, surfactant and a catalyst of urethane formation.

The rigid fire retardant polyurethane foams thus formed are particularly useful for insulation purposes.

CROSS REFERENCE TO RELATED APPLICATION

This application is a continuation-in-part of Ser. No. 843,743 filed July 22, 1969, now abandoned.

DESCRIPTION OF THE PRIOR ART

In view of the importance to develop low cost polyurethane insulation material, much investigation has been done relating to the applicability of sucrose-based polyols for this purpose, because of the low cost of sucrose as a base for polyurethane polyether polyols. These investigations for the most part have centered around the use of the sucrose-base polyol with toluene diisocyanate and other diisocyanates to form the polyurethane product. These diisocyanates, particularly toluene diisocyanate, are volatile and in some instances hazardous to the health of those working with the material. Sucrose polyols and their use in polyurethane foam are generally described in U.S. Pats. 3,222,357, 3,153,002, 3,314,902 and 3,265,-641. The sucrose polyols therein described generally have from 10 to 25 mols of an alkylene oxide, usually propylene oxide, attached thereto. However, the more propylene oxide which is reacted with the sucrose to form the polyurethane, the less advantage one has of the low cost sucrose backbone and the advantageous fire retardancy imparted thereby. With the exception of 3,314,902, all of the investigations described involve the use of a diisocyanate, particularly toluene diisocyanate. U.S. Pat. 3,314,902 describes an instance where a sucrose polyol with 11 mols propylene oxide and 4 mols of ethylene oxide are reacted in a one-shot polyurethane system with a polymethylene polyphenyl isocyanate. However, foams produced with adducts having from 10 to 14 mols propylene oxide have poor (high) $k$ factors and an undesirably low percentage of closed cells. That is to say, the closed cells of the resulting polyurethane foam are less than 90%. Where a foam has such cell structure and high $k$ value, it is not as desirable for use as insulation. U.S. Pat. 2,990,376 describes efforts to produce polyurethane foam with an eight-mol propylene oxide adduct of sucrose and three-mol propylene oxide adduct of glycerine. Again, toluene diisocyanate was used to make a foam.

Polymethylene polyphenyl isocyanates having functionalities greater than two are desirable for several reasons. First, they are less volatile than diisocyanates, particularly toluene diisocyanate which is presently the predominantly used diisocyanate component with sucrose polyols, and polymethylene polyphenyl isocyanates produce more easily fire retarded polyurethane foams.

The use of sucrose polyols having from 8 to about 12 mols of propylene oxide per mol of sucrose is important since higher amounts of propylene oxide produce polyurethane foams which tend to be dimensionally unstable and change in volume or length dimensions if subjected to high temperature and high humidities. Therefore, in the production of rigid polyurethane foams, particularly for insulation purposes, it is highly desirable that the foams be fire retardant, have good dimensional stability, have more than 90% closed cell and a $k$ factor less than 0.13.

However, sucrose-based polyols having 7 to about 14 mols propylene oxide are incompatible with the polymethylene polyphenyl isocyanates such that they separate from the isocyanates quickly and fail to properly react in conventional pour systems to produce an attractive even-celled foam.

Therefore, it is an object of my invention to provide polyurethane foams which are fire retardant and have good dimensional stability, more than 90% closed cells and a $k$ factor less than 0.13 which involve the reaction of a polymethylene polyphenyl isocyanate and a sucrose polyol blend formed by reacting from 8 to about 12 mols propylene oxide per mol of sucrose or a sucrose polyol formed by reacting from 9 to about 12 mol propylene oxide per mol of sucrose.

Other objects and advantages of my invention would become apparent to those skilled in the art by reading the following description and examples.

SUMMARY OF THE INVENTION

This invention relates to the production of a rigid fire retardant polyurethane foam having good dimensional stability, more than 90% closed cells and a $k$ factor less than 0.13. The production of this polyurethane foam involves the reaction of a sucrose polyol having from about 9 to about 12 mols of propylene oxide per mol of sucrose or a polyol blend containing at least about 60% by weight sucrose polyol having from 8 to about 12 mols of propylene oxide per mol of sucrose with an isocyanato terminated prepolymer formed by the reaction of an excess of a polymethylene polyphenyl isocyanate with a reactive phosphorus-containing polyol having more than one hydroxyl group reactive with an isocyanato group. The foams produced in the above reaction have been found to be fire retardant while still maintaining good dimensional stability and insulation properties; i.e., high percentage of closed cells and a low $k$ factor.

DESCRIPTION OF THE INVENTION

The advantages of my invention are apparent. I avoid the use of the more toxic diisocyanates while I am able to use a sucrose polyol having a high quantity of sucrose in proportion to the propylene oxide in the polyol. The foam produced has good dimensional stability and is fire retardant. It also has exemplary insulation qualities as shown by the greater than 90% closed cell structure and the $k$ factor less than 0.13.

This foam is produced by a prepolymer method which involves the reaction of a sucrose polyol having from about 9 to about 12 mols propylene oxide per mol of sucrose or a polyol blend containing at least about 60% by weight sucrose polyol having from 8 to about 12 mols of propylene oxide per mol of sucrose with an isocyanato terminated prepolymer formed by the reaction of a phosphorus polyol and a polymethylene polyphenyl isocyanate. The so called "one-shot method" involves the reaction of all of the polyol components with the isocyanate in a single reaction. Such one-shot systems do not accomplish the objectives nor provide the advantages of my invention.

The use of a diisocyanate, particularly toluene diisocyanate, is avoided in the practice of my invention by using polymethylene polyphenyl isocyanate having a functionality greater than two. These polymethylene polyphenyl isocyanates are produced by the phosgenation of the reaction product of aniline and formaldehyde. Such reactions are well known and described in U.S. Pats. 2,683,730, 3,277,173, 3,344,162 and 3,362,979, for example.

The polymethylene polyphenyl isocyanates thus formed have functionalities greater than two which can be varied up to the higher functionality materials. In practice, however, functionalities greater than four are attained only with difficulty. However, for purposes of practice of my invention, materials with a functionality as high as five may be used. It is preferred that the functionality be from two to about four, and especially preferred that the functionality of the polymethylene polyphenyl isocyanate used in the practice of my invention be from about 2.3 to about 3.5.

In the practice of my invention an excess of this polymethylene polyphenyl isocyanate is reacted with a phosphorus-containing polyol to form an isocyanato terminated prepolymer. It is preferred that the prepolymer have from 21% to about 30% free isocyanato groups in the prepolymer.

The phosphorus-containing polyols useful in the practice of my invention, of course, must contain reactive hydrogen atoms in order to react with the isocyanate to produce the prepolymer. It is preferred that these hydrogen atoms be on hydroxyl groups of a hydroxy terminated phosphorus-containing polyol.

The preferred phosphorus-containing polyols are those produced by the reaction of an alkylene oxide having two to four carbon atoms, for example, ethylene oxide, propylene oxide and the isomers of butylene oxide with phosphorus acids and esters thereof having reactive OH groups. There are many of these materials available to those skilled in the art. For example, many reactive phosphorus-containing polyols useful for the practice of my invention are described in U.S. Pat. 3,251,785. Especially useful is a phosphorus-containing polyol sold under the trademark of Vircol 82 which contains two reactive hydroxyl groups. These materials with two reactive hydroxyl groups react readily with the excess polymethylene polyphenyl isocyanate to form the prepolymers useful in the practice of my invention. Other useful phosphorus-containing polyols are produced by reacting a lower alkylene glycol such as ethylene glycol, propylene glycol and the like with a phosphoric acid, particularly polyphosphoric acid, to form an ester and then propoxylating the resulting ester until it is a substantially neutral compound. Monohydric alcohols such as butyl alcohol, isobutyl alcohol and higher alcohols having preferably up to eight carbon atoms or a mono lower alkyl glycol ether such as ethylene glycol monomethyl ether, propylene glycol monomethyl ether, ethylene glycol monoethyl ether, ethylene glycol monopropyl ether, ethylene glycol monobutyl ether, and the like reacted with phosphoric acids, particularly polyphosphoric acid, are alkoxylated preferably with propylene oxide, to form useful phosphorus-containing polyols.

Acceptable phosphorus-containing materials are produced by reacting a lower alkylene oxide with the ester formed by reacting the phosphoric acid with ethylene chlorohydrin.

Generally, the phosphorus-containing polyols useful in the practice of my invention may be defined as "a reactive phosphorus-containing polyol having more than one hydrogen atom reactive with an isocyanato group."

As hereinbefore stated, these reactive groups are preferably hydroxyl groups. The preferred phosphorus-containing compound will usually have about two reactive hydroxyl groups. The above phosphorus-containing polyols when incorporated into the polyurethane foams of my invention in the practice of my invention impart to the resulting foam excellent fire retardancy while yet permitting polyurethane foams having a high percentage of closed cells and low $k$ factor to be produced.

The above-described isocyanato terminated prepolymer is reacted in the practice of my invention with polyol blends containing sucrose polyols having about 8 to about 12 mols propylene oxide reacted per mol of sucrose or sucrose polyols having about 9 to about 12 mols propylene oxide reacted per mol of sucrose. As has been stated previously, sucrose polyols having this content of propylene oxide are very difficult to use to produce polyurethane foams having acceptable dimensional stability, fire retardancy and insulating properties with a polymethylene polyphenyl isocyanate.

The sucrose polyol is formed by reacting from about 8 to 12 mols propylene oxide, butylene oxide, or mixtures of propylene oxide or butylene oxide with ethylene oxide, per mol of sucrose. Sucrose polyols formed by reacting propylene oxide, butylene oxide or a predominance of propylene oxide or butylene oxide and a small amount, say one to four mols, of ethylene oxide in the mentioned molar proportions, are substantially equivalent with respect to the problems accompanying their use. In describing my invention it should be understood that what is said with respect to propylene oxide adducts applies to these other adducts as well.

The reaction of surcrose with alkylene oxides is well known and is amply described in aforementioned U.S. Pat. 3,153,002, for example. Briefly, the method consists essentially of dissolving the sucrose in a small amount of water; e.g., about 5% to about 20% in a pressure container and contacting the resultant solution with the alkylene oxide under pressure until a desired degree of oxyalkylation has been obtained. The reaction may be catalyzed with a base, such as sodium hydroxide, sodium carbonate, sodium acetate, or trimethylamine, etc.; the amount thereof being within the range of about 0.1% to about 10%. When the desired number of mols have been reacted with the sucrose, the catalyst is neutralized and the polyol recovered.

Any of the methods of manufacture of sucrose polyols are applicable to the practice of my invention. It has been attempted to use the sucrose polyols within the scope of my invention with polymethylene polyphenyl isocyanates by admixing it with alkylene oxide adducts of other polyhydric compounds in an attempt to make the material more compatible with the polymethylene polyphenyl isocyanate. Materials such as propylene oxide adducts of polyhydric alcohols, such as sorbitol, glycerol, trimethylolpropane and the like, while often useful for blending with sucrose polyols in the polyol component did not previously produce satisfactory rigid polyurethane foams. However, in the practice of my invention a blend of the sucrose polyol with a glycerin/propylene oxide adduct having a molecular weight of from about 400 to 800 and a sorbitol/propylene oxide adduct having a molecular weight from 600 to about 1000 are especially useful. When such a polyol mixture is used in order to achieve the desired properties it is necessary that the sucrose polyol make up about at least 60% by weight of the blend.

When a sucrose polyol is reacted with a prepolymer with no other polyol present, sucrose polyols formed by reacting 9 to 12 mols propylene oxide, butylene oxide, or mixtures of propylene oxide or butylene oxide with ethylene oxide, per mol of sucrose are used because the sucrose 8 mol adduct as the sole polyol is incompatible with the blowing agent.

In the production of polyurethane foams in the practice of my invention, other known additives are necessary. One such constituent is the blowing agent. Some examples of such material are trichloromonofluoromethane, dichlorodifluoromethane, dichloromonofluoromethane, 1,1-dichloro-1-fluoromethane, 1,1-difluoro - 1,2,2 - trichloromethane, chloropentafluoroethane, and the like. Other useful blowing agents include low-boiling hydrocarbons such as butane, pentane, hexane, cyclohexane, and the like. See U.S. Pat. 3,072,582, for example.

Many catalysts of urethane formation are useful in the practice of my invention. Such catalyst which either may be used alone or in combination with other catalysts are, for example, dimethylaminoethanol, tetramethylpropanediamine, triethylenediamine, tetramethyl - 1,3-butanediamine, dimethylethanolamine, methyltriethylenediamine, N-methylmorpholine, N-ethylmorpholine, and the like. There are many tertiary amine catalysts which are useful and well known to those skilled in the art both as to the proportion which should be used and the catalyst compounds themselves. The catalyst is employed in catalytic amounts such as from about 0.1 wt. percent to about 6 wt. percent based upon the weight of the polyol.

Surfactant agents better known as silicone oils, are added to serve as a cell stabilizer. Some representative materials are sold under the names of SF-1109, L-520, L-521 and DC-193 which are, generally, polysiloxane polyoxyalkylene blocked copolymers, such as those disclosed in U.S. Pats. 2,834,748, 2,917,480 and 2,846,458, for example.

Should additional fire retardancy be desired, physical additives may be used which do not interact with the polyurethane foaming components. Such materials are neutral, aliphatic or aromatic esters of acids of phosphorus. Some examples of such additives which have been used are tributyl phosphate, tris(2-chloroethyl)phosphate, tricresol phosphate, triphenyl phosphate, butyldibutyl phosphonate, diethyl-2-ethylhexyl phosphonate, butyldiphenyl phosphonate, dimethylmethyl phosphonate, tris(2-chloroethyl) phosphate and tris(2,3-dichloropropyl)phosphate. Other physical additives are well known to those skilled in the art.

The practice of my invention will be better described and understood by those skilled in the art by the following examples which are offered for purposes of illustration only and should not be considered as limiting the scope of my invention.

EXAMPLE 1

This example illustrates the difficulty in preparing "one-shot" rigid urethanes from polymethylene polyphenyl isocyanates and sucrose polyols. A solution was prepared by mixing 34.3 parts of a sucrose nine-mol propylene oxide adduct having a hydroxyl number of 581, 0.5 part of silicone surfactant (SF-1109 purchased from the General Electric Co.), 0.6 part of dimethylaminoethanol, 0.4 part tetramethylpropanediamine and 14 parts of fluorocarbon-11 ($CCl_3F$) blowing agent. To this mixture was added 50.2 parts of Mondur MR (a polymethylene polyphenyl isocyanate with a functionality of about 2.7). The mixture of components and isocyanate was stirred for ten seconds with a high speed stirrer and then poured into an open container. Reaction started in about 40 seconds and the foam began to rise. It rose about half the expected height and then collapsed.

EXAMPLE 2A

A prepolymer was prepared by mixing ten parts of a reactive phosphorus containing diol (Vircol 82) with 90 parts of a polymethylene polyphenyl isocyanate having a functionality of 2.6 and heating the mixture at 85° C. for one hour. The prepolymer analyzed as 26.2% free NCO content.

The prepolymer was added to the rest of the components of the formulation and the mixture stirred for ten seconds. The mixture was poured into an open container and then allowed to rise.

Formulation:
| | |
|---|---|
| Prepolymer _____ parts by weight__ | 319.8 |
| Sucrose 9.5 PO adduct (hydroxyl number 566) _____ parts by weight__ | 187.2 |
| Silicone SF-1109 _____ do____ | 3.0 |
| Dimethylaminoethanol _____ do____ | 3.6 |
| Tetramethylpropanediamine _____ do____ | 2.4 |
| Fluorocarbon-11b (stabilized $CCl_3F$) _do____ | 84.0 |
| Cream time, sec. _____ | 25 |
| Rise time, sec. _____ | 175 |
| Tack-free time, sec. _____ | 110 |
| Density, pounds/foot _____ | 1.97 |
| Tensile, p.s.i. _____ | 51 |
| Heat distortion temp., ° C. _____ | 211 |
| Percent closed cells _____ | 91.4 |
| Burn rating, ASTM 1692 _____ | |
| Inches burned _____ | 1.3 |

[1] Self-extinguishing.

Dimensional stability

158° F., 100% relative humidity:
After 24 hours: change in volume/weight/length, percent _____ 3/—1/2
After one week: change in volume/weight/length, percent _____ 7/—2/4

At 180° F. in dry atmosphere:
After one week: change in volume/weight/length, percent _____ —2/—1/2

EXAMPLE 2B

The following ingredients were weighed into a can: 187.2 g. of sucrose-9.5 propylene oxide adduct, 32 g. of Vircol 82, 3 g. of silicone oil, 3.6 g. of dimethylaminoethanol, 2.4 g. of tetramethylpropanediamine and 84 g. of fluorocarbon-11b (blowing agent). The mixture was stirred thoroughly. Then 288 g. of the same polymethylene polyphenylisocyanate used in 2A was added, the mixture was stirred for 15 seconds and the ingredients poured into a box. The foam had a cream time of 35 seconds, rise time of 300 seconds and a tack-free time of 420 seconds. The foam was not suitable for any application requiring any strength. It crumbled when finger-tip pressure was applied.

This demonstrates that in order to make polyurethane foams from low molecular weight adducts of sucrose and polymethylene polyphenyl isocyanates, it is necessary to prepare prepolymers using phosphorus polyols.

EXAMPLE 3A

A blend of polyols was prepared which contained the following: 67% by weight sucrose-9-mol propylene oxide adduct, 19% by weight sorbitol-propylene oxide adduct which had a hydroxyl number of 480 and 14 ft. percent glycerine-propylene oxide adduct which had a molecular weight of 400. This blend will be referred to as Polyol 3A.

EXAMPLE 3B

A "one-shot" rigid foam was prepared from Polyol 3A and a polymethylene polyphenyl isocyanate using the following formulation:

| | |
|---|---|
| Mondur MR _____ parts by weight__ | 47.8 |
| Polyol 3A _____ do____ | 36.7 |
| Silicone SF-1109 (silicon oil) _____ do____ | 0.5 |
| Dimethylaminoethanol _____ do____ | 0.6 |
| Tetramethylpropanediamine _____ do____ | 0.4 |
| Fluorocarbon-11B _____ do____ | 14.0 |
| Cream time, sec. _____ | 40 |
| Rise time, sec. _____ | 155 |
| Tack-free time, sec. _____ | 135 |
| Density, pounds/cubic foot _____ | 2.0 |
| Initial $k$ factor _____ | 0.133 |
| Percent closed cells _____ | 86.3 |
| Tensile, pounds/sq. inch _____ | 34.4 |
| Burn rate—inches/minute _____ | 6.5 |

Dimensional stability

158° F., 100% relative humidity:
  24 hours:
    Volume change, percent ---------------- 4
    Weight change, percent ---------------- −7
    Linear change, percent ---------------- 2
  One week:
    Volume change, percent ---------------- 1
    Weight change, percent ---------------- −10
    Linear change, percent ---------------- 2
After one week at 180° F. and under dry conditions:
  Volume change, percent -------------------- 3
  Weight change, percent -------------------- −7
  Linear change, percent -------------------- 2
After one week at −20° F. under dry conditions:
  Volume change, percent -------------------- −3
  Weight change, percent -------------------- −1
  Linear change, percent -------------------- −2

While the above foam demonstrates good dimensional stability the fire retardancy was poor and the percentage of closed cells was low.

EXAMPLE 4

Two additional foams were made using Polyol 3A. In both cases prepolymers were used. In one case, the polymethylene polyphenyl isocyanate had a functionality of about 2.7 (Mondur MR) and in the second a functionality of about 2.3 (Carwinate 390P). A phosphorus diol was prepared by adding 13.75 pounds of polyphosphoric acid (84% phosphorous pentoxide) to 7.89 pounds of ethylene glycol and then adding 60 pounds of propylene oxide. Foam 4A below uses the prepolymer having a free isocyanate of 27.3% prepared from the isocyanate having a functionality of 2.7. Foam 4B uses an isocyanate with functionality of 2.3 and the final prepolymer has a free isocyanate content of 27.5%.

|  | Foam 4A | Foam 4B |
|---|---|---|
| Parts by weight: |  |  |
|   Prepolymer | [1] 50.7 | [2] 50.6 |
|   Polyol 3A | 33.8 | 33.9 |
|   Silicone oil | 0.5 | 0.5 |
|   Dimethylaminoethanol | 0.6 | 0.6 |
|   Tetramethylpropanediamine | 0.4 | 0.4 |
|   Fluorocarbon 11b | [3] 14.0 | 14.0 |
| Cream time, sec | 35 | 40 |
| Rise time, sec | 170 | 190 |
| Tack-free time, sec | 130 | 150 |
| Density, pounds/cu. ft. | 2.1 | 2.0 |
| Initial $k$ factor | 0.115 | 0.117 |
| Tensile, pounds sq. in. | 45 | 44 |
| Heat distortion temp., °C | 182 | 175 |
| Percent closed cells | 93 | 93 |
| Burn rating | S.E. |  |
| Inches burned (ASTM 1692) | 3.0 | 3.3 |
| Dimensional stability: |  |  |
|   After 24 hours at 158° F. and 100% RH: |  |  |
|     Volume change, percent | 6 | 6 |
|     Weight, change, percent | −1 | −1 |
|     Linear change, percent | 4 | 4 |
|   After one week at 158° F. and 100% RH: |  |  |
|     Volume change, percent | 9 | 10 |
|     Weight change, percent | −2 | −1 |
|     Linear change, percent | 6 | 6 |
|   After one week at 180° F. and dry: |  |  |
|     Volume change, percent | 4 | 4 |
|     Weight change, percent | −1 | 0 |
|     Linear change, percent |  | 2 |
|   After one week at −20° F. and dry: |  |  |
|     Volume change, percent | −4 | −4 |
|     Weight change, percent | 1 | 1 |
|     Linear change, percent | −3 | −3 |

[1] 27.3% free NCO.    [2] 27.5% NCO.    [3] Blowing agent.

Other phosphorus-containing polyols were prepared in substantially the same manner described in Example 4 and mixed to produce prepolymers with a polymethylene polyphenyl isocyanate having a functionality of about 2.6 sold under the trademark PAPI. These preparations and the phosphorus-containing polyols are described in Table 1.

TABLE 1

[Phosphorus-containing polyols]

| Phosphate polyol | L | M | N | O | P | Q | R | S |
|---|---|---|---|---|---|---|---|---|
| Preparation: |  |  |  |  |  |  |  |  |
|   Polyphosphoric acid, 115% | 5.50 lbs. | 5.50 lbs. | 171 grams | 277 grams | 277 grams | 277 grams | 5.50 lbs. | 5.68 lbs. |
|   Hydroxyethyl compound | EG[1] 3.11 lbs. | EG, 71.5 grams | n-Butanol, 181 grams | i-Butanol, 300 grams | PG [2] 309 grams | i-Butanol 108 grams | ECH[3] 6.45 lbs. | ECH, 3.76 lbs. |
|   Mol ratio, hydroxyl compound/$P_2O_5$ | 1.67 | 1.0 | 2.45 | 2.5 | 2.5 | 0.9 | 2.5 | 1.41. |
|   Alkoxylation temperature, °C | 24.7 lbs. | 720 grams | 530 grams | 660 grams | 898 grams | 832 grams | 17.50 lbs. | 16.90 lbs. |
|   Propylene oxide | 50 | 50 | 40 | 50 | 100 | 55 | 100 | 100. |
| Properties: |  |  |  |  |  |  |  |  |
|   Hydroxyl number, mg. KOH/g | 377 | 347 | 359 | 373 | 459 | 297 | 305 | 293. |
|   Acid number, mg. KOH/g | 1.60 | 0.96 | 3.31 | 0.62 | 0.11 | 1.8 | 0.58 | 0.77. |
|   pH (10:1 methanol/water) | 3.0 | 3.5 | 2.7 | 3.4 | 5.5 | 3.1 | 3.9 | 4.0. |
|   Percent phosphorus | 6.8 | 7.5 | 7.1 | 8.5 | 6.9 | 8.2 | 9.1 | 8.8. |
|   Percent chlorine |  |  |  |  |  |  | 7.6 | 6.15. |
|   Viscosity, cps. at 26±1° C | 630 | 1,088 | 96 | 129 | 518 | 420 | 293 | 371. |
|   Average number mol. wt. | 404 |  | 338 | 392 | 323 | 397 | 312 |  |
|   Functionality; OH/mol | 2.72 |  | 217 |  | 2.65 | 2.1 | 1.70 | 1.94. |
| Remarks | Clear | Clear | Clear | Clear | Clear | Clear | Celar | Clear. |

[1] EG = ethylene glycol.    [2] PG = propylene glycol.    [3] ECH = ethylene chlorohydrin.

Prepolymers formed using these phosphorus-containing polyols are described in Table 2. The reactants used are set forth along with the conditions under which the prepolymer is produced. In most instances one prepolymer is prepared at ambient temperatures and another at 85° C. for one hour from the same formulation. Temperature conditions are indicated on the table.

ical properties of compression and tensile strength are good. The even numbered examples show that the prepolymer has good storage stability in that the foams were produced from prepolymers which had been stored for six weeks prior to producing the foam.

TABLE 3

[Foams of propoxylated phosphorylated glycol prepolymers with Polyol 3A]

| | Example Number | | | | | | | | | | | |
|---|---|---|---|---|---|---|---|---|---|---|---|---|
| | 5 | 6 | 7 | 8 | 9 | 10 | 11 | 12 | 13 | 14 | 15 | 16 |
| Storage age of prepolymer | Initial | 6 wks. | Initial | 6 wks. | Initial | 6 wks. | Initial | 6 wks. | Initial | 6 wks | Initial | 6 wks. |
| Formulation, p.b.w.: | | | | | | | | | | | | |
| Polyol 3A | 33.8 | 33.7 | 34.0 | 34.0 | 34.6 | 34.6 | 34.4 | 34.4 | 34.6 | 34.6 | 33.8 | 34.3 |
| DME [1] | 0.6 | 0.6 | 0.6 | 0.6 | 0.6 | 0.6 | 0.6 | 0.6 | 0.6 | 0.6 | 0.6 | 0.6 |
| TMPDA [2] | 0.3 | 0.4 | 0.4 | 0.4 | 0.4 | 0.4 | 0.4 | 0.4 | 0.4 | 0.4 | 0.4 | 0.4 |
| Silicone oil, DC 193 | 0.5 | 0.5 | 0.5 | 0.5 | 0.5 | 0.5 | 0.5 | 0.5 | 0.5 | 0.5 | 0.5 | 0.5 |
| Blowing agent, R-11b | 14.0 | 14.0 | 14.0 | 14.0 | 14.0 | 14.0 | 14.0 | 14.0 | 14.0 | 14.0 | 14.0 | 14.0 |
| Prepolymer AA, ambient [3] | 50.8 | 5.08 | | | | | | | | | | |
| Prepolymer AA, 85° C./1 hr.[3] | | | 50.6 | 50.6 | | | | | | | | |
| Prepolymer BB, ambient [4] | | | | | 50.0 | 50.0 | | | | | | |
| Prepolymer BB, 85° C./1 hr.[4] | | | | | | | 50.2 | 50.2 | | | | |
| Prepolymer EE, ambient [5] | | | | | | | | | 49.9 | 49.9 | | |
| Prepolymer EE, 85° C./1 hr.[5] | | | | | | | | | | | 50.8 | 50.2 |
| Physical properties: | | | | | | | | | | | | |
| Cream time, sec | 46 | 32 | 41 | 31 | 40 | 35 | 40 | 34 | 43 | 40 | 43 | 38 |
| Rise time, sec | 240 | 180 | 205 | 170 | 195 | 180 | 190 | 180 | 200 | 190 | 235 | 200 |
| Tack-free time, sec | 175 | 140 | 150 | 125 | 130 | 120 | 135 | 120 | 140 | 145 | 145 | 150 |
| Density, p.c.f. | 2.13 | 2.10 | 2.09 | 2.02 | 2.08 | 2.07 | 2.06 | 2.04 | 2.10 | 2.09 | 2.06 | 2.06 |
| k-Factor, initial | 0.119 | 0.123 | 0.120 | 0.123 | 0.121 | 0.123 | 0.123 | 0.122 | 0.122 | 0.124 | 0.124 | 0.124 |
| Compression, 10%, p.s.i.: | | | | | | | | | | | | |
| With rise | 44 | 42 | 44 | 39 | 42 | 40 | 42 | 41 | 43 | 41 | 44 | 42 |
| Cross rise | 18 | 16 | 17 | 15 | 17 | 15 | 17 | 15 | 18 | 16 | 18 | 16 |
| Tensile, p.s.i. | 49 | 46 | 47 | 41 | 41 | 46 | 46 | 50 | 44 | 54 | 40 | 49 |
| Heat distortion, temp., ° C. | 187 | 190 | 200 | 202 | 193 | 192 | 188 | 201 | 190 | 196 | 197 | 192 |
| Percent closed cells | 93 | 93 | 92 | 92 | 93 | 92 | 93 | 92 | 92 | 92 | 92 | 92 |
| Burn, in./sec. to flameout | 2.1/48 | 2.9/65 | 2.7/55 | 2.4/75 | 2.8/58 | .7/64 | 2.9/52 | 2.4/56 | 3.0/59 | | 2.8/64 | |
| Burn rate, in./min | | | | | | | | | | 3.2 | | 3.0 |
| Dimensional stability: | | | | | | | | | | | | |
| 158° F., 100% R.H., 1 week: | | | | | | | | | | | | |
| Percent volume change | 7.3 | 10.4 | 5.9 | 7.3 | 6.8 | 8.5 | 6.2 | 7.9 | 6.4 | 9.1 | 4.6 | 8.6 |
| Percent weight change | −0.9 | −1.9 | −0.4 | −1.9 | −0.7 | −1.2 | −0.8 | −1.2 | −0.7 | −1.3 | −0.1 | −1.3 |
| Percent linear change | 5.0 | 5.7 | 3.8 | 5.0 | 4.6 | 5.5 | 3.9 | 5.0 | 4.0 | 5.5 | 3.0 | 5.5 |
| 180° F., dry, 1 week: | | | | | | | | | | | | |
| Percent volume change | 3.3 | 5.3 | 2.8 | 5.5 | 3.3 | 5.2 | 4.0 | 5.0 | 3.3 | 8.7 | 2.6 | 5.5 |
| Percent weight change | −0.4 | −0.8 | −0.4 | −0.8 | −0.4 | −0.6 | −0.4 | −0.6 | −0.3 | −1.0 | −0.5 | −0.7 |
| Percent linear change | 2.5 | 3.5 | 2.0 | 3.5 | 2.3 | 3.5 | 2.3 | 4.0 | 2.5 | 3.5 | 2.0 | 3.0 |
| −20° F., dry, 1 week: | | | | | | | | | | | | |
| Percent volume change | −5.2 | −2.6 | −4.9 | −2.1 | −5.4 | −2.8 | −5.1 | −2.6 | −4.9 | −2.5 | −4.3 | −2.8 |
| Percent weight change | 1.4 | 0.4 | 2.2 | 0.2 | 5.1 | 0.1 | 0.7 | 0.2 | 1.4 | 0.4 | 1.4 | 0.2 |
| Percent linear change | −3.4 | −2.0 | −2.8 | −1.7 | −3.1 | −2.0 | −3.0 | −1.5 | −3.0 | −2.0 | −2.6 | −2.0 |

[1] DME=Dimethylaminoethanol.
[2] TMPDA=Tetramethylpropanediamine.
[3] Prepolymer of phosphate polyol L (1.66 M ethylene glycol/1.0 M $P_2O_5$; PrO at 50° C.) with PAPI.
[4] Prepolymer of phosphate polyol M (1.0 M ethylene glycol/1.0 M $P_2O_5$; PrO at 50° C.) with PAPI.
[5] Prepolymer of phosphate polyol P (2.5 M propylene glycol/1.0 M $P_2O_5$; PrO at 100° C.) with PAPI.

TABLE 2

[Preparation of prepolymers]

| | Preparation | | | Reaction temperature | | Percent | |
|---|---|---|---|---|---|---|---|
| Prepolymer No. | Phosphorus polyol | Grams | PAPI, grams | Ambient | 85° C. for 1 hr. | NCO | P |
| AA | L | 107.4 | 2,000 | x | x | 27 | 0.35 |
| BB | M | 111.8 | 2,000 | x | x | 28 | 0.40 |
| CC | N | 109.8 | 2,000 | x | x | 29 | 0.37 |
| DD | O | 107.8 | 2,000 | x | x | 28 | 0.44 |
| EE | P | 96.6 | 2,000 | x | x | 28 | 0.32 |
| FF | Q | 120 | 2,000 | x | x | 28 | 0.46 |
| GG | R | 118.6 | 2,000 | | x | 28 | 0.51 |
| HH | S | (1) | (2) | | x | 28 | 0.50 |
| JJ | N | 282 | 1,718 | x | | 23 | 1.0 |
| KK | O | 236 | 1,764 | x | | 24 | 1.0 |
| LL | Q | 244 | 1,756 | x | | 24 | 1.0 |
| MM | P | 290 | 1,710 | x | | 22 | 1.0 |

[1] 2.92 pounds.  [2] 48.46 pounds.

EXAMPLES 5–16

Polyurethane foams were prepared by reacting Polyol 3A with prepolymers formed with PAPI and propoxylated phosphorylated glycol. The formulations and properties of these foams are shown in Table 3. Examination of data on the table shows that the foams of my invention have good dimensional stability as well as a k factor of consistently less than 0.13. The percentage of closed cells of all the foams produced is 92–93%. In addition the phys-

EXAMPLES 17–34

Polyurethane foams were prepared by reacting prepolymers formed with PAPI and a propoxylated phosphorylated butanol prepolymer with Polyol 3A. The formulations and properties of the foams produced are shown on Table 4. Again the storage stability comparison was made with the same good results.

TABLE 4

[Foams of propoxylated phosphorylated butanol prepolymers with polyol 3A]

| Storage age of prepolymer | 17 Initial | 18 6wks. | 19 Initial | 19 6wks. | 20 6wks. | 21 Initial | 21 6wks. | 22 6wks. | 23 Initial | 23 6wks. | 24 6wks. | 25 Initial | 25 6wks. | 26 6wks. | 27 Initial | 27 6wks. | 28 6wks. | 29 Initial | 29 6wks. | 30 6wks. | 31 Initial | 31 6wks. | 32 6wks. | 33 Initial | 33 6wks. | 34 6wks. |
|---|---|---|---|---|---|---|---|---|---|---|---|---|---|---|---|---|---|---|---|---|---|---|---|---|---|---|
| Formulation, p.b.w.: | | | | | | | | | | | | | | | | | | | | | | | | | | |
| Polyol 3A | 37.0 | 34.4 | 35.4 | | 34.4 | 30.3 | | 30.3 | 34.2 | | 34.6 | 33.3 | | 34.3 | 33.0 | | 33.0 | 34.2 | | 34.3 | 34.2 | | 34.3 | 33.0 | | 33.0 |
| DME | 0.6 | 0.6 | 0.6 | | 0.6 | 0.6 | | 0.6 | 0.6 | | 0.6 | 0.6 | | 0.6 | 0.6 | | 0.6 | 0.6 | | 0.6 | 0.6 | | 0.6 | 0.6 | | 0.6 |
| TMPDA | 0.4 | 0.4 | 0.4 | | 0.4 | 0.4 | | 0.4 | 0.4 | | 0.4 | 0.4 | | 0.4 | 0.4 | | 0.4 | 0.4 | | 0.4 | 0.4 | | 0.4 | 0.4 | | 0.4 |
| Silicone oil, DC 193 | 0.5 | 0.5 | 0.5 | | 0.5 | 0.5 | | 0.5 | 0.5 | | 0.5 | 0.5 | | 0.5 | 0.5 | | 0.5 | 0.5 | | 0.5 | 0.5 | | 0.5 | 0.5 | | 0.5 |
| Blowing agent, R-11b | 14.0 | 14.0 | 14.0 | | 14.0 | 14.0 | | 14.0 | 14.0 | | 14.0 | 14.0 | | 14.0 | 14.0 | | 14.0 | 14.0 | | 14.0 | 14.0 | | 14.0 | 14.0 | | 14.0 |
| Prepolymer CC, ambient [1] | 47.6 | 50.1 | | | | | | | | | | | | | | | | | | | | | | | | |
| Prepolymer CC, 85° C./hr. [1] | | | 49.2 | 50.1 | | | | | | | | | | | | | | | | | | | | | | |
| Prepolymer JJ, 1% P ambient [1] | | | | | | 54.3 | 54.3 | | | | | | | | | | | | | | | | | | | |
| Prepolymer DD, ambient [2] | | | | | | | | 54.3 | 50.4 | | | | | | | | | | | | | | | | | |
| Prepolymer DD, 85° C./1 hr. [2] | | | | | | | | 51.3 | | | 49.9 | | | | | | | | | | | | | | | |
| Prepolymer KK, 1% P ambient [2] | | | | | | | | | | | | 51.3 | | 50.2 | | | | | | | | | | | | |
| Prepolymer FF, ambient [3] | | | | | | | | | | | | | | | 51.6 | | 51.6 | | | | | | | | | |
| Prepolymer FF, 85° C./1 hr. [3] | | | | | | | | | | | | | | | | | | 50.4 | | 50.2 | 5.04 | | 50.2 | | | |
| Prepolymer LL, 1% P ambient [3] | | | | | | | | | | | | | | | | | | | | | | | | 51.6 | | 51.6 |
| Physical properties: | | | | | | | | | | | | | | | | | | | | | | | | | | |
| Cream time, sec | 42 | 36 | 41 | | 37 | 36 | | 30 | 40 | | 37 | 42 | | 38 | 41 | | 27 | 43 | | 38 | 42 | | 35 | 40 | | 25 |
| Rise time, sec | 190 | 185 | 185 | | 180 | 215 | | 210 | 185 | | 190 | 260 | | 200 | 220 | | 200 | 180 | | 180 | 170 | | 170 | 180 | | 165 |
| Tack-free time, sec | 135 | 135 | 130 | | 135 | 135 | | 140 | 135 | | 140 | 150 | | 140 | 140 | | 120 | 130 | | 130 | 125 | | 125 | 120 | | 105 |
| Density, p.c.f. | 2.05 | 2.02 | 2.04 | | 2.04 | 2.13 | | 2.07 | 2.03 | | 2.04 | 2.08 | | 2.00 | 2.14 | | 2.10 | 2.07 | | 2.08 | 2.07 | | 1.99 | 2.16 | | 2.02 |
| k Factor, initial | 0.122 | 0.121 | 0.120 | | 0.128 | 0.119 | | 0.120 | 0.121 | | 0.122 | 0.122 | | 0.124 | 0.118 | | 0.121 | 0.125 | | 0.123 | 0.121 | | 0.126 | 0.115 | | 0.119 |
| Compression, 10%, p.s.i.: | | | | | | | | | | | | | | | | | | | | | | | | | | |
| With rise | 40 | 37 | 42 | | 39 | 36 | | 36 | 41 | | 38 | 41 | | 40 | 46 | | 40 | 43 | | 42 | 44 | | 40 | 43 | | 37 |
| Cross rise | 16 | 16 | 17 | | 16 | 18 | | 15 | 17 | | 15 | 18 | | 16 | 18 | | 17 | 17 | | 16 | 18 | | 15 | 18 | | 16 |
| Tensile, p.s.i | 45 | 40 | 46 | | 44 | 47 | | 44 | 43 | | 45 | 40 | | 40 | 47 | | 43 | 43 | | 49 | 46 | | 45 | 45 | | 45 |
| Heat distortion temp., °C | 183 | 190 | 185 | | 197 | 168 | | 172 | 193 | | 190 | 196 | | 189 | 168 | | 172 | 192 | | 202 | 192 | | 192 | 172 | | 173 |
| Percent closed cells | 92 | 92 | 92 | | 92 | 91 | | 93 | 92 | | 92 | 92 | | 91 | 93 | | 93 | 91 | | 92 | 93 | | 92 | 93 | | 93 |
| Burn, in./sec. to flameout | | 2.2/54 | 3.3/75 | | 2.8 | 1.5/40 | | 1.4/38 | 2.4/58 | | 2.1/54 | 2.2/47 | | 2.1/49 | 1.5/39 | | 1.4/35 | 2.2/48 | | 1.8/47 | 2.5/57 | | 1.9/48 | 1.6/42 | | 1.5/39 |
| Burn rate, in./min | 3.7 | | | | | | | | | | | | | | | | | | | | | | | | | |
| Dimensional stability: | | | | | | | | | | | | | | | | | | | | | | | | | | |
| 158° F., 100% R.H., 1 week: | | | | | | | | | | | | | | | | | | | | | | | | | | |
| Percent volume change | 7.5 | 7.7 | 6.5 | | 8.4 | 10.1 | | 14.6 | 4.5 | | 8.5 | 5.3 | | 7.3 | 12.3 | | 9.2 | 5.9 | | 8.6 | 5.1 | | 9.6 | 10.9 | | 11.6 |
| Percent weight change | -0.7 | -1.4 | -0.4 | | -1.4 | -1.0 | | -1.9 | -0.4 | | -1.4 | -0.6 | | -1.2 | -0.9 | | 1.6 | -0.5 | | -1.3 | -1.4 | | -1.5 | -0.7 | | -1.7 |
| Percent linear change | 4.8 | 5.5 | 4.1 | | 4.0 | 6.5 | | 9.0 | 4.0 | | 5.5 | 3.4 | | 5.5 | 7.8 | | 7.0 | 4.0 | | 5.5 | 4.0 | | 5.5 | 6.7 | | 7.5 |
| 180° F., dry, 1 week: | | | | | | | | | | | | | | | | | | | | | | | | | | |
| Percent volume change | 2.8 | 5.2 | 3.7 | | 5.0 | 4.0 | | 6.0 | 3.8 | | 5.3 | 2.8 | | 4.6 | 3.8 | | 6.8 | 3.3 | | 5.5 | 3.9 | | 5.8 | 4.0 | | 6.0 |
| Percent weight change | -0.6 | -0.8 | -0.4 | | -0.8 | -0.7 | | -1.0 | -0.4 | | -0.5 | -0.4 | | -0.7 | -0.5 | | -0.9 | -0.4 | | -0.7 | -0.2 | | -0.5 | -0.3 | | -0.6 |
| Percent linear change | 2.1 | 3.0 | 2.1 | | 3.0 | 2.8 | | 3.5 | 2.3 | | 3.5 | 1.8 | | 3.0 | 2.5 | | 3.5 | 2.0 | | 3.5 | 2.5 | | 3.5 | 3.0 | | 4.0 |
| -20° F., dry, 1 week: | | | | | | | | | | | | | | | | | | | | | | | | | | |
| Percent volume change | -5.0 | -2.0 | -5.4 | | -2.3 | -6.0 | | -4.1 | -4.9 | | -2.6 | -5.6 | | -2.1 | -6.4 | | -2.2 | -5.0 | | -2.8 | -5.1 | | -3.3 | -6.0 | | -3.7 |
| Percent weight change | 1.5 | 0.7 | 1.4 | | 0.7 | 1.6 | | 0.6 | 1.9 | | 0.4 | 1.6 | | 0.6 | 1.2 | | 0.6 | 1.8 | | 0.1 | 1.8 | | 0.2 | 1.3 | | 0.3 |
| Percent linear change | -3.0 | -1.0 | -3.1 | | -1.6 | -3.4 | | -1.5 | -3.0 | | -1.5 | -2.6 | | -1.5 | -4.0 | | -1.5 | -3.0 | | -1.6 | -3.0 | | -2.5 | -3.5 | | -2.5 |

[1] Prepolymer of phosphate polyol N (2.45 M n-BuOH/1.0 M P₂O₅; PrO at 40° C.) with PAPI.
[2] Prepolymer of phosphate polyol D (2.5 M i-BuOH/1.0 M P₂O₅; PrO at 100° C.) with PAPI.
[3] Prepolymer of phosphate polyol Q (0.9 M i-BuOH/1.0 M P₂O₅; PrO at 60° C.) with PAPI.

EXAMPLES 35-38

Foams were also prepared by reacting a prepolymer based upon propoxylated phosphorylated ethylene chlorohydrin and PAPI with Polyol 3A. These foams are described in Table 5. Example 37 is a control foam produced in a "one-shot" reaction in the same manner as the foam of Example 3B. The $k$ factor was greater than 0.13 and the percentage of closed cells, while close to 90%, was not high enough.

TABLE 5

[Foams of propoxylated phosphorylated ethylene chlorohydrin—PAPI prepolymer]

|  | Example number | | | |
| --- | --- | --- | --- | --- |
|  | 35 | 36 | 37 | 38 |
| Storage age of prepolymer | Initial | 6 wks. |  | Initial |
| Formulation, p.b.w.: | | | | |
| Polyol 3A | 34.5 | 34.5 | 37.4 | 35.1 |
| DME | 0.6 | 0.6 | 0.6 | 0.6 |
| TMPDA | 0.4 | 0.4 | 0.4 | 0.4 |
| Silicone oil, DC-193 | 0.5 | 0.5 | 0.5 | 0.5 |
| Blowing agent, R-11b | 14.0 | 14.0 | 14.0 | 13.0 |
| Prepolymer GG [1] | 50.0 | 50.0 |  |  |
| Prepolymer HH [2] |  |  |  | 50.4 |
| PAPI, control |  |  | 47.1 |  |
| Physical properties: | | | | |
| Cream time, sec | 35 | 42 | 45 | 36 |
| Rise time, sec | 180 | 205 | 240 | 175 |
| Tack-free time, sec | 120 | 150 | 175 | 120 |
| Density, p.c.f | 1.97 | 2.08 | 2.00 | 2.15 |
| $k$-Factor, initial | 0.127 | 0.115 | 0.133 | 0.118 |
| Compression, 10%, p.s.i.: | | | | |
| With rise | 41 | 39.3 | 30.9 | 42.0 |
| Cross rise | 13 | 15.5 | 14.5 | 16.7 |
| Tensile, p.s.i | 41 | 47 | 41.8 | 43.1 |
| Heat distortion temp., °C | 187 | 191 | 191 | 196 |
| Percent closed cells | 91 | 93.1 | 89.9 | 93.3 |
| Burn, inches/sec. to flameout | 1.5/44 | 1.9/41 |  | 2.6/58 |
| Burn rate, in./min |  |  | 4.1 |  |
| Dimensional stability: | | | | |
| 158° F., 100% R.H., 1 week: | | | | |
| Percent volume change | 6.6 | 7.4 | 6.4 | 5.8 |
| Percent weight change | −0.1 | −1.6 | −3.1 | −1.1 |
| Percent linear change | 3.5 | 4.3 | 3.8 | 3.6 |
| 180° F., dry, 1 week: | | | | |
| Percent volume change | 4.3 | 3.7 | 4.2 | 3.5 |
| Percent weight change | −0.1 | 0 | −0.5 | 0.2 |
| Percent linear change | 2.3 | 2.0 | 2.3 | 2.0 |
| −20° F., dry, 1 week: | | | | |
| Percent volume change | −7.7 | −4.1 | −3.1 | −5.5 |
| Percent weight change | 0.3 | 0.7 | 4.9 | 1.5 |
| Percent linear change | −4.8 | −2.5 | −1.8 | −2.3 |

[1] Prepolymer of phosphate polyol R (2.5 M ECH/1.0 P²O₅; PrO at 100° C.) with PAPI.
[2] Prepolymer of phosphate polyol S (1.41 M ECH/1.0 P₂O₅; PrO at 100° C.) with PAPI.

Examples 39–42 illustrate comparisons of one-shot foams and foams prepared from prepolymers using a sucrose polyol which is the 12 mol propylene oxide adduct of sucrose and a sucrose polyol which is the 8 mol propylene oxide odduct of surcose. Example 39 is a one-shot fom prepared using a 12 mol propylene oxide sucrose adduct reacted with a polymethylene polyphenyl isocyanate. Example 40 is foam prepared with a 12 mol propylene oxide sucrose adduct using a prepolymer made from a polymethylene polyphenyl isocyanate. Example 40 is a foam prepared with a 12 mol propylene oxide sucrose adduct using a prepolymer made from a polymethylene polyphenyl isocyanate. Example 41 is a one-shot foam prepared using an 8 mol propylene oxide sucrose adduct in a polyol blend reacted with a polymethylene polyphenyl isocyanate. Example 42 is a foam prepared with an 8 mol propylene oxide sucrose adduct in a polyol blend using a prepolymer made from a polymethylene polyphenyl isocyanate.

TABLE 6

|  | Example 39 | Example 40 |
| --- | --- | --- |
| Formulation, p.b.w.: | | |
| Sucrose 12 PO adduct | 37.4 | 34.9 |
| Silicone oil | 0.5 | 0.5 |
| Dimethylaminoethanol | 0.3 | 0.3 |
| Tetramethylpropanediamine | 0.5 | 0.5 |
| CFCl₃ | 13.0 | 13.0 |
| PAPI | 48.3 |  |
| Prepolymer |  | 50.8 |
| NCO/OH | 1.05 | 1.05 |
| Cream time, sec | 35 | 27 |
| Rise time, sec | 195 | 120 |
| Tack-free time, sec | 180 | 95 |
| Remarks | Initially very friable, cells slightly coarse. | Smooth skin, good cells, attractive foam. |
| $k$ Factor, B.t.u, in./hr., sq. ft., ° F | 91.2 | 92.9 |

TABLE 7

|  | Example 41 | Example 42 |
| --- | --- | --- |
| Formulation, p.b.w.: | | |
| Sucrose 8 PO adduct | 67.0 | 67.0 |
| Propoxylated sorbitol polyol | 33.0 | 33.0 |
| Silicone oil | 1.5 | 1.5 |
| Dimethylaminoethanol | 1.5 | 1.5 |
| Tetramethylpropanediamine | 1.5 | 1.5 |
| CFCl₃ | 35.0 | 35.0 |
| PAPI | 133.0 |  |
| Prepolymer |  | 150.0 |
| Cream time, sec | 35 | 33 |
| Rise time, sec | 300 | 165 |
| Tack-free time, sec | 180 | 105 |
| Skin appearance | Very rough | Very smooth |
| Cell appearance | Very coarse mixture fairly incompatible. | Good. |
| $k$ Factor | 0.276 | 0.124 |

Examples 39–42 illustrate that the foams made via the prepolymer route are very superior. The $k$-factor shows that the closed cell content of the foam made via the prepolymer route is very high, while the foam made by the one-shot route is extremely low.

The above examples show that a sucrose polyol which was previously used only with great difficulty now may be used to produce fire retardant dimensionally stable polyurethane foams having a low $k$ factor and a high percentage closed cells.

Many variations and modifications of the above-described invention will be obvious to those skilled in the art without departing from the scope and spirit thereof.

I claim:

1. A rigid fire-retardant polyurethane foam having good dimensional stability, more than 90% closed cells and a $k$ factor less than 0.13 which is the reaction product of a polyol comprising about at least 60% by weight sucrose polyol and an isocyanato terminated prepolymer in the presence of a catalyst of urethane formation, a blowing agent and a surfactant; wherein the sucrose polyol is the reaction product of 8 to about 9.5 mols propylene oxide, butylene oxide, or mixtures of propylene oxide or butylene oxide with ethylene oxide per mol of sucrose and the prepolymer is the reaction product of an excess of a polymethylene polyphenylisocyanate having a functionality greater than two to about four and a phosphorus containing polyol; wherein the ratio of isocyanato groups to hydroxyl groups ranges from 0.95 to 1.25.

2. The rigid polyurethane foam of claim 1 wherein the polymethylene polyphenyl isocyanate has a functionality of from about 2.3 to 3.5 and the sucrose polyol is the propylene oxide adduct of sucrose.

3. The rigid polyurethane foam of claim 1 wherein the phosphorus-containing polyol is a propylene oxide adduct of the ester of a phosphoric acid and a lower alkyl glycol, a monohydric alcohol or a lower alkyl alkenylene glycol ether and the sucrose polyol is the propylene oxide adduct of sucrose.

4. The rigid polyurethane foam of claim 1 wherein the isocyanato terminated prepolymer has from 21% to about 30% free isocyanato groups and the sucrose polyol is the propylene oxide adduct of sucrose.

5. The rigid polyurethane foam of claim 4 wherein the sucrose polyol is present in admixture with a glycerine-propylene oxide adduct having a molecular weight of from 400 to about 800 and a sorbitol-propylene oxide adduct having a molecular weight of from 600 to about 1000.

6. The rigid polyurethane of claim 1 wherein the sucrose polyol is the reaction product of 9.5 mols propylene oxide per mol of sucrose.

7. A rigid fire-retardant polyurethane foam having good dimensional stability, more than 90% closed cells and a $k$ factor less than 0.13 which is the reaction product of a sucrose polyol and an isocyanato terminated prepolymer in the presence of a catalyst of urethane formation, a blowing agent and a surfactant; wherein the sucrose polyol is the reaction product of 9 to about 9.5 mols propylene oxide, butylene oxide or mixtures of propylene oxide or butylene oxide with ethylene oxide per mol of sucrose and the prepolymer is the reaction product of an excess of a polymethylene polyphenylisocyanate having a functionality greater than two to about four and a phosphorus containing polyol; wherein the ratio of isocyanato groups to hydroxyl groups ranges from 0.95 to 1.25.

8. The rigid polyurethane foam of claim 7 wherein the polymethylene polyphenyl isocyanate has a functionality of from about 2.3 to 3.5 and the sucrose polyol is the propylene oxide adduct of sucrose.

9. The rigid polyurethane foam of claim 7 wherein the phosphorus-containing polyol is a propylene oxide adduct of the ester of a phosphoric acid and a lower alkyl glycol, a monohydric alcohol or a lower alkyl alkylene glycol ether and the sucrose polyol is the propylene oxide adduct of sucrose.

10. The rigid polyurethane of claim 7 wherein the sucrose polyol is the reaction product of 9.5 mols propylene oxide per mol of sucrose.

11. The method of preparing a fire retardant rigid polyurethane foam having good dimensional stability, more than 90% closed cells and a $k$ factor less than 0.13 from a polyol comprising at least about 60% by weight sucrose polyol and a polymethylene polyphenylisocyanate having a functionality greater than 2 to about four wherein the sucrose polyol is the reaction product of 8 to about 9.5 mols propylene oxide, butylene oxide, or mixture of propylene oxide or butylene oxide with ethylene oxide per mol of sucrose comprising the steps of:
(a) mixing and reacting an excess polymethylene polyphenyl-isocyanate with a phosphorus containing polyol to form an isocyanato terminated prepolymer,
(b) mixing and reacting the isocyanate terminated prepolymer with the polyol wherein the sucrose polyol is prepared by reacting 8 to about 9.5 mols propylene oxide, butylene oxide or mixture of propylene oxide or butylene oxide with ethylene oxide per mol sucrose, in such proportions that the ratio of isocyanato groups to hydroxyl groups ranges from 0.95 to 1.25, in the presence of:
(i) a blowing agent
(ii) a surfactant, and
(iii) a catalyst of urethane formation; and
(c) recovering the rigid polyurethane thus formed.

12. The method of claim 11 wherein the isocyanato terminated prepolymer has from 21% to about 30% free isocyanato groups and the sucrose polyol is the propylene oxide adduct of sucrose.

13. The method of claim 11 wherein the polymethylene polyphenyl isocyanate has a functionality of from about 2.3 to about 3.5 and the sucrose polyol is the propylene oxide adduct of sucrose.

14. The method of claim 11 wherein the sucrose polyol is the reaction product of 9.5 mols propylene oxide per mol of sucrose.

15. The method of preparing a first retardant rigid polyurethane foam having good dimensional stability, more than 90% closed cells and a $k$ factor less than 0.13 from a sucrose polyol and a polymethylene polyphenylisocyanate having a functionality greater than 2 to about four wherein the sucrose polyol is the reaction product of 9 to about 9.5 mols propylene oxide, butylene oxide or mixtures of propylene oxide or butylene oxide with ethylene oxide per mol of sucrose comprising the steps of:
(a) mixing and reacting an excess polymethylene polyphenylisocyanate and a phosphorus containing polyol to form an isocyanate terminated prepolymer,
(b) mixing and reacting the isocyanato terminated prepolymer with a sucrose polyol prepared by reacting 9 to about 9.5 mols propylene oxide, butylene oxide or mixtures of propylene oxide or butylene oxide with ethylene oxide per mol sucrose, in such proportions that the ratio of isocyanato groups to hydroxyl groups ranges from 0.95 to 1.25, in the presence of:
(i) a blowing agent
(ii) a surfactant, and
(iii) a catalyst of urethane formation; and
(c) recovering the rigid polyurethane thus formed.

16. The method of claim 15 wherein the isocyanato terminated prepolymer has from 21% to about 30% free isocyanato groups and the sucrose polyol is the propylene oxide adduct of sucrose.

17. The method of claim 15 wherein the polymethylene polyphenyl isocyanate has a functionality of from about 2.3 to about 3.5 and the sucrose polyol is the propylene oxide adduct of sucrose.

18. The method of claim 15 wherein the sucrose polyol is the reaction product of 9.5 mols propylene oxide per mol of sucrose.

References Cited
UNITED STATES PATENTS

| 3,509,076 | 4/1970 | Anderson | 260—2.5 AR |
| 3,402,132 | 9/1968 | Pelletier | 260—2.5 AR |

FOREIGN PATENTS

| 1,125,305 | 8/1968 | Great Britain | 260—2.5 AR |
| 986,521 | 3/1965 | Great Britain | 260—2.5 AS |

OTHER REFERENCES

Technical Bulletin-101, "The Preparation of Rigid Urethane Foams Based on PAPI"; Upjohn Chemical Co.; Received in the Patent Office not later than Jan. 30, 1967; pp. 1–6.

DONALD E. CZAJA, Primary Examiner

C. W. IVY, Assistant Examiner

U.S. Cl. X.R.
260—2.5 AS, 2.5 AT

UNITED STATES PATENT OFFICE
CERTIFICATE OF CORRECTION

Patent No. 3,783,133　　　　　　　　　Dated January 1, 1974

George Phillip Speranza
Assignor to Jefferson Chemical Company, Inc.
Houston, Texas, a corporation of Delaware It is certified that errors appear in the above-identified patent and that said Letters Patent are hereby corrected as shown below:

In column 6, line 16, "Burn rating, ASTM 1692" should read -- Burn rating, ASTM 1692$^1$ --; column 6, line 53, "ft." should read -- wt. --. In column 8, last line of table, under "R", "Celar" should read -- Clear --. In column 9, Note 3 under Table 3, "(1.66 M" should read -- (1.665 M --; column 9, Table 3, 6th line under "Formulation, p.b.w.:", under Example No. 6, "5.08" should read -- 50.8 --; column 9, Table 3, 5th line under "Physical properties:", under Example No. 11, "0.123" should read -- 0.121 --; column 9, Table 3, 5th line under "Physical properties:", under Example No. 12, "0.122" should read -- 0.123 --; column 9, Table 3, 12th line under "Physical properties:", under Example No. 10, ".7/64" should read -- 2.7/64 --. In columns 11 and 12, Table 4, 11th line under "Physical properties:", under Example No. 18, "92" should read -- 91 --; columns 11 and 12, Table 4, 11th line under "Formulation, p.b.w.:", under Example 22, "51.3" should read -- -- --; columns 11 and 12, Table 4, 13th line under "Formulation, p.b.w.:", under Example 31, "5.04" should read -- 50.4 --. In column 13, Table 5, 3rd line under "Dimensional stability:", under Example 35, "-0.1" should read -- 0.8 --; column 13, Table 5, 2nd line under "Physical properties:", under Example 38, "175" should read -- 170 --; column 13, Table 5, 3rd line under "Physical properties:", under Example 38, "120" should read -- 125 --; column 13, line 61, "surcose" should read -- sucrose --. In column 14, line 69, "alkenylene" should read -- alkylene --. In column 16, line 18, "and" should read -- with --.

Signed and sealed this 13th day of August 1974.

(SEAL)
Attest:

McCOY M. GIBSON, JR.　　　　　C. MARSHALL DANN
Attesting Officer　　　　　　　Commissioner of Patents